United States Patent [19]

Inukai et al.

[11] 4,341,653
[45] Jul. 27, 1982

[54] LIQUID-CRYSTALLINE 4-ALKYLCYCLOHEXYL ESTERS

[75] Inventors: Takashi Inukai; Kenji Furukawa; Shigeru Sugimori; Hideo Sato, all of Yokohamashi, Japan

[73] Assignee: Chisso Corporation, Osaka, Japan

[21] Appl. No.: 238,209

[22] Filed: Feb. 26, 1981

[30] Foreign Application Priority Data

Feb. 29, 1980 [JP] Japan .................. 55-24865

[51] Int. Cl.³ .................. C09K 3/34; G02F 1/13; C07C 69/75; C07C 69/76
[52] U.S. Cl. .................. 252/299.63; 560/102; 350/350 R; 252/299.7
[58] Field of Search .................. 252/299.63, 299.64, 252/299.65, 299.7; 560/102; 350/350 R

[56] References Cited

U.S. PATENT DOCUMENTS

| | | | |
|---|---|---|---|
| 4,065,489 | 12/1977 | Steinstrasser | 252/299.65 |
| 4,082,428 | 4/1978 | Hsu | 252/299.64 |
| 4,113,647 | 9/1978 | Coates et al. | 252/299.62 |
| 4,149,413 | 4/1979 | Gray et al. | 252/299.63 |
| 4,195,916 | 4/1980 | Coates et al. | 252/299.63 |
| 4,229,315 | 10/1980 | Krause et al. | 252/299.63 |
| 4,257,911 | 3/1981 | Gray et al. | 252/299.65 |
| 4,293,434 | 10/1981 | Deutscher et al. | 252/299.63 |

OTHER PUBLICATIONS

Gray, G. W. et al., Mol. Cryst. Liq. Cryst., vol. 37, pp. 157-211 (1976).
Gray, G. W. et al., Mol. Cryst. Liq. Cryst., vol. 34 (Letters), pp. 211-217 (1977).

*Primary Examiner*—Teddy S. Gron
*Attorney, Agent, or Firm*—Fred Philpitt

[57] ABSTRACT

Novel liquid crystal compounds having broader and preferable liquid crystal temperature ranges are provided. Their optically active isomers form a cholesteric liquid crystal, while their racemates form a nematic liquid crystal.

The compounds are trans-4"-alkylcyclohexyl esters of 4'-(2-methyl-butyl)-4-biphenylcarboxylic acid expressed by the general formula

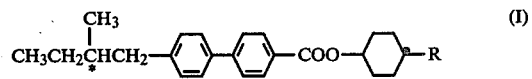

(I)

wherein R represents a straight chain alkyl group having 1 to 10 carbon atoms, and the symbol * represents an asymmetric carbon atom.

4 Claims, No Drawings

LIQUID-CRYSTALLINE 4-ALKYLCYCLOHEXYL ESTERS

BACKGROUND OF THE INVENTION

1. Field of the Invention

This invention relates to novel liquid crystal compounds, and more particularly it relates to compounds whose optically active isomers form cholesteric liquid crystals and whose racemates form nematic liquid crystals.

2. Description of the Prior Art

Recently, application of liquid crystals to display elements and practical use of the latter have been greatly advanced, and many liquid crystal compounds have already been found accordingly. However, from the viewpoint of practical uses, i.e. from the standpoint of application of liquid crystal display elements to various fields, liquid crystal compounds further suitable to the respective uses have been desired, and particularly, there have been mostly desired liquid crystal materials which are endurable to long-term uses under severe use conditions. Presently any single compound which satisfies by itself such a requirement has scarcely been found; hence for this purpose it has been necessary to admix a plurality of liquid crystal compounds which are stable and varied in the liquid crystal temperature range to obtain liquid crystal compositions suitable to the respective use purposes. The present invention is directed to novel liquid crystal compounds which are effectively usable for such an object.

Cholesteric compounds as one kind of liquid crystal compounds have generally raised mostly a problem of stability; among them, however, chemically stable cholesteric compounds have already been known. Examples thereof are as follows:

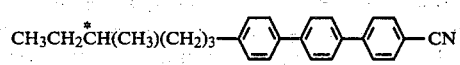
(1)

Cholesteric temperature: 163° ~ 186° C.
Melting point: 120° C. (This compound forms a smectic liquid crystal between 120° C. and 163° C.).
(G. W. Gray; J. de Physique, 36, Cl 337 (1975)).

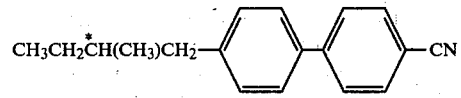
(2)

Cholesteric temperature: −54° ~ −30° C.
Melting point: 4° C.
(G. W. Gray, D. G. Donnell; Electronic Letters, 11 (23), 556 (1975)).

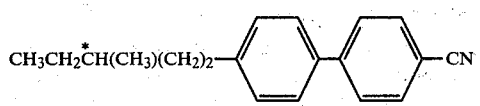
(3)

Cholesteric temperature: −22° ~ −14° C.
Melting point: 9° C.
(The literature is the same as that of (2)).

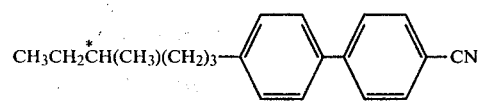
(4)

Cholesteric temperature: −10° ~ −20° C.
Melting point: 28° C.
(The literature is the same as that of (2).).

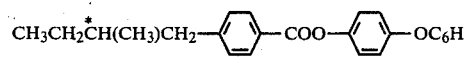
(5)

Cholestric temperature: 24° ~ 30° C.
(Japanese patent application laid-open No. Sho 51-78791/1976)

However, the respective cholesteric temperatures of these compounds are either in a very high temperature range or in a very low temperature range, and further these ranges are narrow; hence these compounds are unfavorable as constituting components of liquid crystal mixtures having a sufficiently broad cholesteric temperature range as liquid crystal substances which can be employed for various usual uses. Thus, substances which exhibit a cholesteric phase in a more suitable temperature range are required.

For attaining the above-mentioned object, the present inventors previously searched for suitable cholesteric liquid crystal compounds and applied for patent with regard to some of them (Japanese patent application Nos. Sho 51-95,874/1976, Sho 51-106,384/1976, Sho 51-116,849/1976, Sho 52-25,308/1977, Sho 52-31,734/1977, etc.), and further have searched for such compounds, and as a result have found the compounds of the present invention which are stable as in the case of the above-mentioned compounds and yet have broader and preferable liquid crystal temperature ranges.

SUMMARY OF THE INVENTION

The present invention resides in:
Trans-4″-alkylcyclohexyl esters of 4′-(2-methylbutyl)-4-biphenylcarboxylic acid expressed by the general formula

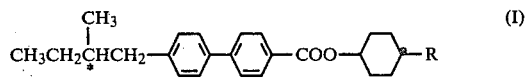
(I)

wherein R represents a straight chain alkyl group having 1 to 10 carbon atoms, and the symbol * represents an asymmetric carbon atom, and liquid crystal compositions containing the same.

DESCRIPTION OF THE PREFERRED EMBODIMENTS

The compounds of the present invention have a most similar structure, among the compounds of the above-mentioned patent applications, to the structure of the compounds of No. Sho 51-106,384/1976, expressed by the general formula

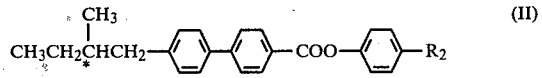
(II)

wherein $R_2$ represents a straight chain alkyl group having 1 to 8 carbon atoms, but they possess superior properties to those of the above compounds of the formula (II), as mentioned later.

The carbon atom having the symbol * in the compounds (I) of the present invention is an asymmetric carbon atom, and optically active substances consisting of only one antipode exhibit a cholesteric liquid crystal phase, while those consisting of racemic substances exhibit a nematic liquid crystal phase. Further the compounds (I) of the present invention have neither such a drawback of unstability to moisture as observed in the case of Schiff compounds, nor such a drawback of unstability to light as observed in the case of azoxy compounds; they are chemically very stable compounds.

The compounds (I) of the present invention can be prepared as follows:

First, where compounds which are optically active substances and exhibit a cholesteric liquid crystal phase are prepared, optically active 4'-(2-methylbutyl)-4-biphenylcarboxylic acid is converted into its acid chloride, which is then esterified by reacting it with a trans-4-alkylcyclohexanol in the presence of a base such as pyridine to obtain the objective compounds. The preparation of the optically active 4'-(2-methylbutyl)-4-biphenylcarboxylic acid as the starting raw material is known (see Japanese patent application laid-open No. Sho 53-31,649/1978 (corresponding to the above Japanese patent application No. Sho 51-106,384)).

Further in the case of preparation of compounds which are racemic substances and exhibit a nematic liquid crystal phase, racemic 4'-(2-methyl-butyl)-4-biphenylcarboxylic acids are converted into their acid chlorides, which, in turn, are esterified in the same manner as mentioned above. The preparation of the racemic 4'-(2-methylbutyl)-4-biphenylcarboxylic acids as the starting raw material is also known (see Japanese patent application laid-open No. Sho 51-122045 (corresponding to Japanese patent No. 908101)).

The liquid crystal temperature ranges of the compounds (I) are shown in Table I.

TABLE 1

|  | Optical active substance | | Racemic substance | |
| --- | --- | --- | --- | --- |
| R in formula (I) | C-Ch point (°C.) | Ch-I point (°C.) | C-N point (°C.) | N-I point (°C.) |
| n-C$_3$H$_7$ | 65 | 126 | 49.5 | 128 |
| n-C$_4$H$_9$ | 57.5 | 119.5 | 53 | 120.5 |
| n-C$_5$H$_{11}$ | 54.5 | 125 | 53.5 | 126 |
| n-C$_6$H$_{13}$ | 59 | 115 | 57.5 | 105 |
| n-C$_7$H$_{15}$ | 53 | 116 | 53 | 116 |

(C: solid phase, Ch: cholesteric liquid crystal phase, N: nematic liquid crystal phase, I: transparent phase)

The compounds (I) exhibit a dextrorotary optical activity relative to sodium D-line in chloroform. Further when they are mixed with nematic liquid crystals, the resulting mixture exhibits a cholesteric liquid crystal phase, and the rotation direction of its screw axis is toward right.

For example, a cholesteric liquid crystal mixture obtained by adding 9.3% by weight (all of the succeeding percentages being by weight) of a compound (I) wherein R represents n-C$_4$H$_9$ to LIXON GR-63 (a trade name of a product manufactured by Chisso Corporation) as one of commercial nematic liquid crystals, has a pitch of 2.6 μm (as measured according to Cano-Wedge method). By extrapolation method through this value, the intrinsic pitch of the compound (I) wherein R represents n-C$_4$H$_9$ is determined to be 0.2 μm. This value is a small one comparable to those of pitches of cholesteric liquid crystals as cholesterol derivatives, and the twisting force of the compound is great; hence, by adding the compounds of the formula (I) in such an extent of low concentration that the characteristic properties of nematic liquid crystals as the mother substances are not greatly changed by the addition, it is possible to obtain cholesteric liquid crystal mixtures which are suitable to the following various uses:

By adding a small amount (about 0.1 to 0.2%) of the compounds of the formula (I) to Np liquid crystals (i.e. nematic liquid crystals having a positive dielectric anisotropy) employed for electric field effect type display elements (FETN mode) having twisted liquid crystals, it is possible to enhance the uniformity of display. Examples of the basic Np liquid crystals are as follows:

(1) liquid crystal mixtures consisting of 4-cyano-4'-alkylbiphenyl(s), 4-cyano-4'-alkoxybiphenyl(s) and 4-cyano-4'-alkylterphenyl(s); (2) liquid crystal mixtures consisting of p-alkoxybenzylidene-p-alkylaniline(s) and p-alkoxybenzylidene-p-cyanoaniline(s); (3) liquid crystal mixtures of p'-cyanophenyl esters of p-alkylbenzoic acid; (4) liquid crystal mixtures of p'-cyanophenyl esters of p-alkyloxybenzoic acids with p'-cyanophenyl esters of p-alkylbenzoic acids; (5) mixtures obtained by adding p'-cyanophenyl ester(s) of p-alkylbenzoic acid to p-alkoxy-p'-azoxybenzene(s); and (6) mixtures obtained by adding a liquid crystal material having cyano group in the direction of major axis of molecule, to 4-alkyl esters or 4-alkyloxyphenyl esters of 4-trans-alkylcyclohexanecarboxylic acids.

For utilizing display elements through the phase change of cholesteric⇌nematic, the compounds of formula (I) of the present invention are added in an amount of about 1 to 3% to Np liquid crystals. In this case, it is suitable to uses in usual use temperature ranges to employ preferably a combination of two or more kinds of the compounds of the formula (I) (see Example 3).

Further, the optically active subtances of the compounds (I) of the present invention can be employed in the usual application fields of cholesteric liquid crystals such as temperature display based on the fact that the wave lengths of their scattering light vary depending on temperatures.

The racemic substances of the compounds (I) of the present invention are chemically stable nematic liquid crystals and have suitable nematic temperature ranges as shown in Table I; hence it is apparent that they are very useful as constituting components of practical nematic liquid crystal compositions for display elements. Their use examples are shown in Example 4.

The compounds of the present invention will be mentioned in more detail by way of Examples where their preparation examples and use examples are illustrated.

EXAMPLE 1

[Preparation of a compound of the formula (I) wherein R is n-C$_6$H$_{13}$, having an optical activity]

Optical active 4-(2-methyl-butyl)-4-biphenylcarboxylic acid as a raw material was prepared according to a method described in the above Japanese patent application No. Sho 51-106,384/1976 (Japanese patent application laid-open No. Sho 53-31649/1978). On the other hand, 4-n-hexylcyclohexanol was synthesized by the catalytic hydrogenation of p-n-hexylphenol, and a mixture of 60% of trans-form substance with 40% of cis-form substance obtained by subjecting the above product to fractional distillation was employed.

Thionyl chloride (50 g) was added to the optical active 4-(2-methyl-butyl)-4-biphenylcarboxylic acid (50 g) and the mixture was heated under reflux for 30 minutes, followed by distilling off excess thionyl chloride to obtain the acid chloride of the above carboxylic acid, which was then dissolved in toluene (500 ml). The resulting solution was dropwise added with stirring into an ice-cooled liquid mixture of the above 4-n-hexylcyclohexanol (36 g), pyridine (100 ml) and toluene (500 ml) over 20 minutes, followed by heating with stirring at 50° to 60° C. for 30 minutes. The resulting material was cooled with water and then poured into a mixture of 6 N hydrochloric acid and ice, followed by separating the acidic mixture, washing the resulting organic layer with water, then with 2 N caustic sodium aqueous solution, thereafter with water, removing toluene, twice recrystallizing the resulting residue from ethanol to obtain a colorless crystal (22 g) of the objective optical active 4''-n-hexyl-cyclohexyl ester of 4-(2-methyl-butyl)-4-biphenylcarboxylic acid. This product was a cholesteric liquid crystal having the phase transition point shown in Table 1 and had a specific rotatory power $[\alpha]_D^{15°}$ of $+10.7°$ (in 10% $CHCl_3$ solution). Further the values of elemental analysis thereof accorded well with the theoretical values as described below.

|   | Analytical value | Calculated value (in terms of $C_{30}H_{42}O$) |
|---|---|---|
| C | 82.7% | 82.90% |
| H | 9.8% | 9.74% |

EXAMPLE 2

[Preparation of a compound of the formula (I) wherein R is n-$C_5H_{11}$, in racemic form]

4-(2-Methyl-butyl)-4'-biphenylcarboxylic acid in racemic form as a raw material was prepared according to a method described in the above Japanese patent No. 908,101 (Japanese patent publication No. Sho 52-41,256/1977). This product had a melting point of 223° C. and when melted, formed a smectic liquid crystal. Further 4-n-pentylcyclohexanol was synthesized by the catalytic hydrogenation of p-n-pentylphenol, and a mixture of 65% of trans-form substance with 35% of cis-form substance obtained by subjecting the above product to fractional distillation was employed.

Thionyl chloride (50 g) was added to the above 4-(2-methyl-butyl)-4'-biphenylcarboxylic acid in racemic form (50 g) and the mixture was heated under reflux for 40 minutes, followed by distilling off excess thionyl chloride to obtain the acid chloride of the above carboxylic acid, which was then dissolved in toluene (500 ml). The resulting solution was dropwise added with stirring into an ice-cooled liquid mixture of the above 4-n-pentyl-cyclohexanol (34 g), pyridine (100 ml) and toluene (500 ml), over 20 minutes, followed by heating with stirring at 50° to 60° C. for 30 minutes. The resulting material was cooled with water and poured into a mixture of 6 N hydrochloric acid with ice, followed by separating the acidic mixture, washing the resulting organic layer with water, 2 N caustic sodium aqueous solution and water in this order, distilling off toluene and twice recrystallizing the resulting residue from ethanol to obtain a colorless crystal (21 g) of the objective 4''-n-pentyl-cyclohexyl ester of 4-(2-methylbutyl)-4'-biphenylcarboxylic acid in racemic form. This product was a nematic liquid crystal having a phase transition point shown in Table 1. Its values of elemental analysis accorded well with its theoretical values.

|   | Analytical value | Calculated value (in terms of $C_{29}H_{40}O_2$) |
|---|---|---|
| C | 82.7% | 82.80% |
| H | 9.6% | 9.59% |

EXAMPLE 3

(Use example 1)

A Np liquid crystal consisting of
4'-pentyl-4-cyanobiphenyl 41.7%,
4'-heptyl-4-cyanobiphenyl 25.1%,
4'-pentyloxy-4-cyanobiphenyl 10.2%,
4'-heptyloxy-4-cyanobiphenyl 9.4% and
4'-octyloxy-4-cyanobiphenyl 13.6%
has a nematic temperature range of $-8° \sim +49°$ C.

To this liquid crystal was added a mixture of compounds of the formula (I) wherein R represents n-$C_4H_9$, n-$C_5H_{11}$ and n-$C_6H_{13}$, respectively, each having an optical activity, and their proportion being 1:1:1, in an amount of 2%. The resulting mixture exhibited a cholesteric phase in a temperature range of $-12°$ to $+50°$ C. When this liquid crystal mixture was sealed in a liquid crystal cell having an electrode distance of 6 μm and an alternating voltage at 1 KHz frequency was impressed, transition to nematic phase took place at a threshold voltage of 10 V, and a rapid increase in the percentage transmission of light was observed.

EXAMPLE 4

(Use example 2)

The same Np liquid crystal of biphenyl group as in Example 3 was employed as a basic liquid crystal. To this liquid crystal was added a mixture of compounds of the formula (I) wherein R represents n-$C_4H_9$, n-$C_5H_{11}$ and n-$C_6H_{13}$, respectively, each being in racemic form and the proportion being 1:1:1, in an amount of 20%. The N-I point (transparent point) of the resulting liquid crystal mixture increased to 63° C. to give a practically more excellent Np liquid crystal.

What is claimed is:

1. Trans-4''-alkylcyclohexyl esters of 4'-(2-methylbutyl)-4-biphenylcarboxylic acid expressed by the general formula

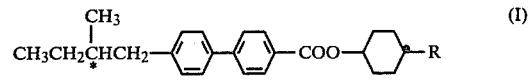

(I)

wherein R represents a straight chain alkyl group having 1 to 10 carbon atoms, and the symbol * represents an asymmetric carbon atom.

2. Compounds according to claim 1 which are optically active substances based on the asymmetric carbon atom having a symbol * attached in said formula (I) and exhibit a cholesteric liquid crystal phase.

3. Compounds according to claim 1 which are racemic substances based on the asymmetric carbon atom having a symbol * attached in said formula (I) and exhibit a nematic phase.

4. Liquid crystal compositions for display elements, obtained by adding compound(s) of said formula (I) of claim 1 to other nematic liquid crystal substances.

* * * * *